Figure 2:
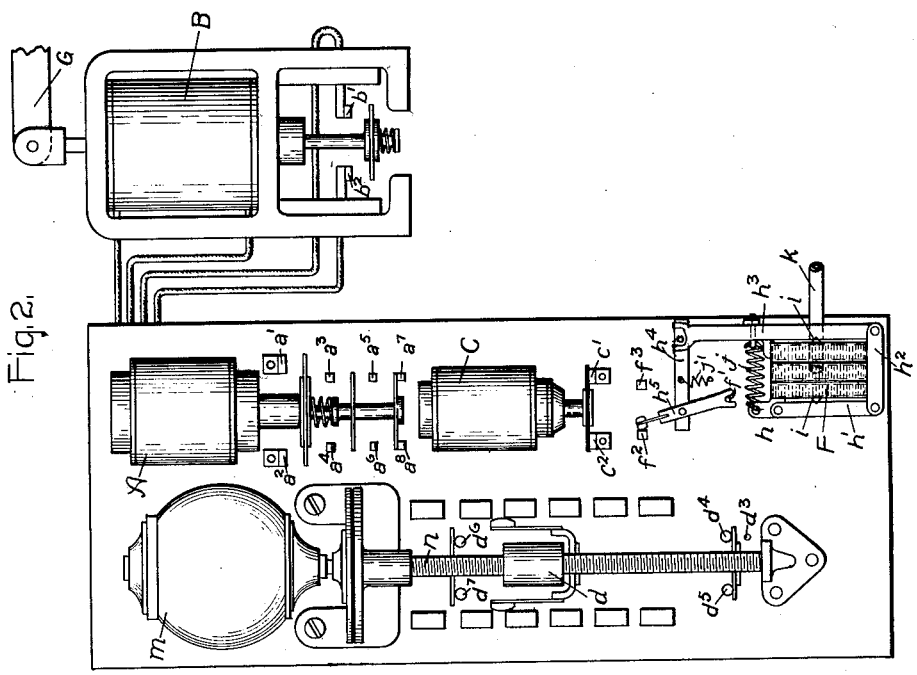

No. 834,147.  
PATENTED OCT. 23, 1906.

S. H. LIBBY.  
AUTOMATIC MOTOR CONTROL.  
APPLICATION FILED MAY 21, 1904.

2 SHEETS—SHEET 1.

WITNESSES:

INVENTOR:  
Sam H. Libby,  
by ............ Att'y

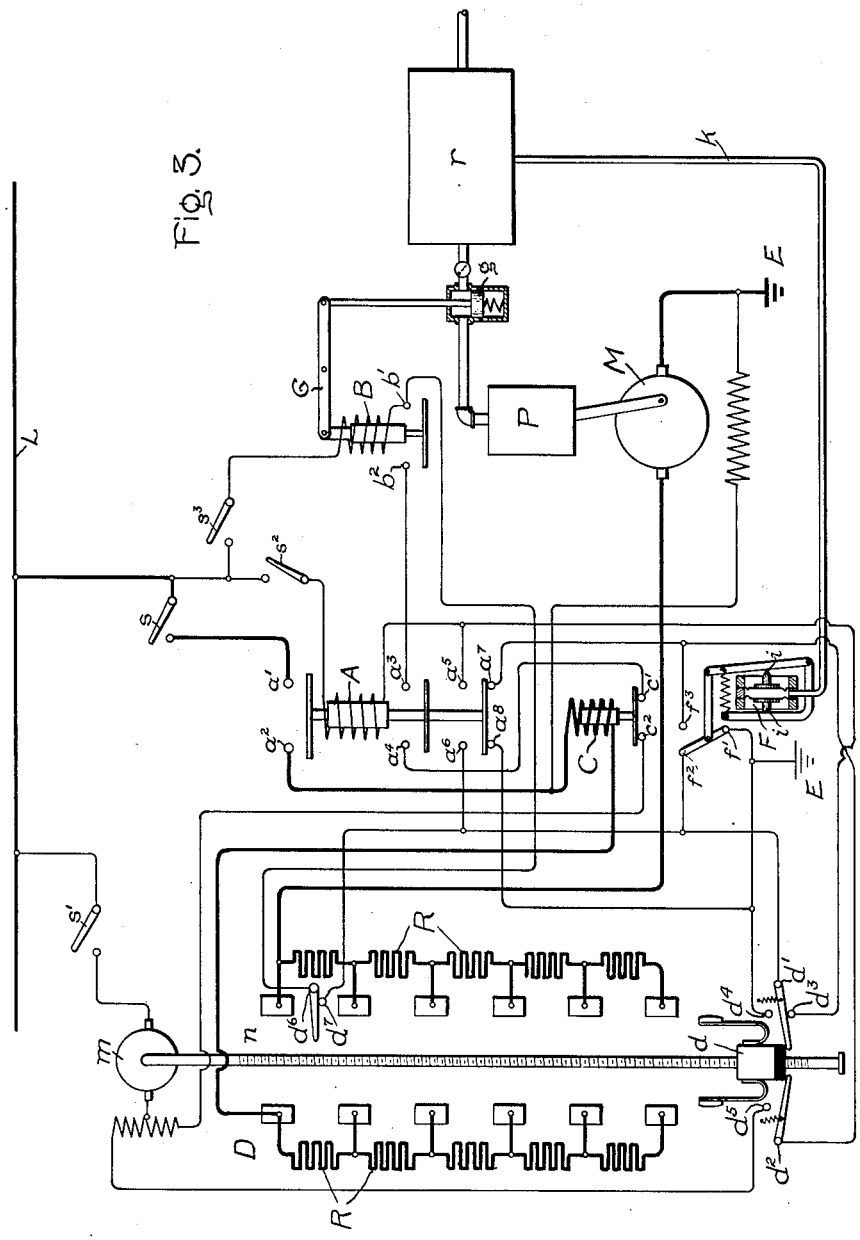

UNITED STATES PATENT OFFICE.

SAM H. LIBBY, OF EAST ORANGE, NEW JERSEY, ASSIGNOR TO SPRAGUE ELECTRIC COMPANY, A CORPORATION OF NEW JERSEY.

AUTOMATIC MOTOR CONTROL.

No. 834,147.    Specification of Letters Patent.    Patented Oct. 23, 1906.

Application filed May 21, 1904. Serial No. 209,035.

*To all whom it may concern:*

Be it known that I, SAM H. LIBBY, a citizen of the United States, residing at East Orange, county of Essex, State of New Jersey, have invented certain new and useful Improvements in Automatic Motor Control, of which the following is a specification.

My invention relates to automatic systems of control for electric motors, and is particularly applicable to the control of motor-driven air-compressors.

The object of my invention is to provide a novel control system which shall insure the most efficient operation of the motor, which shall protect the motor and its circuits against overloads from any cause, and which embodies a number of novel features for accomplishing this end. When an electric motor is employed to drive an air-compressor, it is necessary that the motor should be started and stopped automatically, so as to maintain the pressure in the reservoir within predetermined limits. It is also essential that the motor should be started with resistance in circuit, and for most efficient operation it is essential that this resistance should be gradually cut out as the motor speeds up, and since the starting friction of an air-compressor is large it is usually advisable to provide means for opening a relief-valve at starting, so that the motor may start under a friction-load only and need not begin to compress air until it has brought the compressor up to speed. This is especially important in the case of motors belted to compressors, since in a belt-drive the motor is likely to throw the belt if started under too heavy a load. If the motor-circuit is interrupted or if the current fails while the motor is operating, it is essential that the resistance be automatically cut into circuit with the motor, so that when the motor is again energized it will start under proper conditions. It is also advantageous to employ a check upon the resistance-controlling mechanism to prevent the mechanism from cutting out the resistance too rapidly, thereby overloading the motor and perhaps blowing a fuse.

One feature of my invention consists in organizing and arranging a control-circuit adapted to meet all the requirements which have been set forth above.

Another feature of my invention consists in a novel form of pressure-operated governor adapted to vary the connections of the control-circuit when the pressure falls above and below certain limits, and another feature of my invention consists in a novel form of automatic brake for stopping the resistance-controlling mechanism when the control-circuit is interrupted.

My invention will best be understood by reference to the accompanying drawings, in which—

Figure 1:
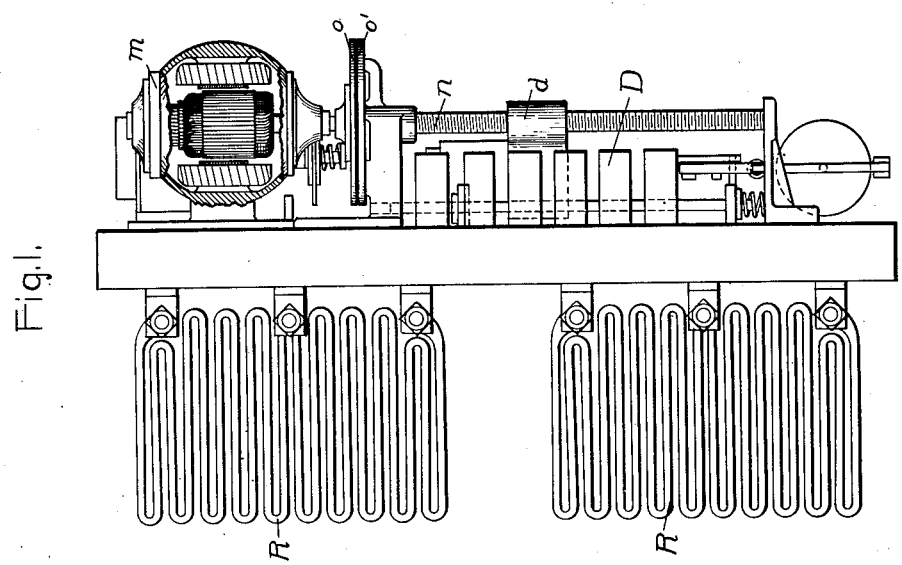

Figure 1 shows an end elevation of a controlling mechanism arranged in accordance with my invention. Fig. 2 shows a front elevation of the same, and Fig. 3 shows diagrammatically the connections of the main motor and its control-circuit.

Referring first to Figs. 1 and 2, $m$ represents a pilot-motor adapted for rotation in either direction and driving the screw $n$, which by its rotation raises and lowers the cross-head $d$, which engages the stationary contacts of the resistance-controlling switch D. R R represent resistances adapted for connection in the circuit of the main motor and connected to the stationary contacts of the switch D. A represents the main controlling-solenoid, which I shall hereinafter designate as the "circuit-closer." This circuit-closer A is provided with a number of bridging members coöperating with the stationary contacts $a'$ to $a^8$. C is a second solenoid, which I shall hereinafter term the "throttle," which acts to prevent a too rapid withdrawal of resistance from the main motor-circuit by checking the action of the pilot-motor $m$. B represents another solenoid, which I shall hereinafter designate as the "relief-valve trip." The core of the solenoid B engages the lever G, which is connected to a relief-valve $g$, by means of which the load may be removed from the piston of the air-compressor at starting. F represents the pressure-operated governor, adapted to vary the control-circuits when the air-pressure falls above and below certain limits. The governor F consists of a double diaphragm, each diaphragm carrying a point $i$, pressing against levers $h'$ and $h^3$, respectively. Lever $h'$ is pivoted to the stationary member $h$ and carries at its other end the link $h^2$, which is also connected to one end of the lever $h^3$. The spring J tends to draw levers $h'$ and $h^3$ together. It will be seen that this arrangement of links and levers produces a very large movement of the upper end of lever $h^3$ for a small relative movement of the double diaphragm F. The upper end of lever $h^3$ engages by a lost-motion connection the link $h^4$, which carries the pivoted member $h^5$. Member $h^5$ is slotted at its lower end and engages stationary pin $f'$. Spring $j'$ exerts a constant downward pull upon the link $h^4$, holding it in engagement with the upper end of lever $h^3$ and tending to rotate the member $h^5$ around the pin $f'$ whenever member $h^5$ is moved in either direction from a vertical position. Member $h^5$ when moved in either direction from the vertical engages a stationary contact $f^2$ or $f^3$. It will be seen that by means of the spring $j'$ and by a lost-motion connection between link $h^4$ and lever $h^5$ a quick closing action is obtained between lever $h^5$ and contacts $f^2$ and $f^3$.

Referring especially to Fig. 1, it will be seen that the armature of pilot-motor $m$ is out of alinement with the fields. Fig. 1 shows the position of the armature when motor $m$ is deënergized. The motor-shaft carries a friction-disk $o$, which when the armature is in the position shown engages a stationary friction-disk $o'$, which supports the weight of the armature. When motor $m$ is energized, the armature is raised by the field-flux into alinement with the field and the friction-disk $o$ is raised out of engagement with the friction-disk $o'$. When motor $m$ is deënergized, the armature falls and its weight presses disk $o$ upon disk $o'$. The disks $o$ and $o'$ thus act as a brake to stop the motor $m$ instantaneously when the circuit of the motor is broken and to release the motor $m$ on the instant that the motor is reënergized. This action is made automatic by the construction of the motor itself.

Referring now to Fig. 3, the arrangement and connections of the control-circuit will be explained. The parts which were shown in Figs. 1 and 2 and which have been discribed in connection therewith are indicated by the same letters as in those figures. M represents the main motor, and L represents the source of current for main motor M and for the control system. The armature-circuit of the main motor is shown in heavy lines, while the control-circuit is shown in light lines. P is an air-compressor driven by the motor and pumping air into a reservoir $r$. $s$ to $s^3$ represent switches by means of which the main circuit and the several portions of the control-circuit may be opened and closed. These switches may be adjacent to or at any desired distance from the motor M and its controlling mechanism.

The operation is as follows: Assume that switches $s$ to $s^3$ are all closed and the governor mechanism in the position shown, corresponding to the lower limit of pressure, with member $h^5$ in engagement with contact $f^2$. The circuit of the main motor M will be opened at contacts $a'$ and $a^2$ of the circuit-closer A, but the following circuits will be closed in the control system: from line L, switch $s^2$, circuit-closer A, contact $d^3$ at the bottom of switch D, contact $d'$, governor-contact $f^2$, pin $f'$ to earth E. A second circuit is also closed from line L, switch $s^3$, relief-valve trip B, contact $b'$, contact $d^6$ at the upper end of switch D, contact $d^7$, governor-contact $f^2$, pin $f'$ to earth E. Circuit-closer A and relief-valve trip B will both draw up their armatures, the relief-valve trip by its action opening the valve on the air-compressor to relieve the pressure on the air-compressor-piston. Circuits will then be closed as follows: from line L, switch $s'$, armature of motor $m$, lower half of field of motor $m$, contact $c^2$ of throttle C, contact $c'$, contact $a^4$ of circuit-closer A, contact $a^3$, contact $b^2$ of relief-valve trip B, contact $b'$, contact $d^6$ at the upper end of switch D, contact $d^7$, governor-contact $f^2$, pin $f'$ to earth E. The circuit of motor $m$ is then closed, so as to start and rotate screw $n$ in the position to raise cross-head $d$. It will be noted that the circuit of motor $m$ is closed by contacts controlled by throttle C, circuit-closer A, and relief-valve trip B in series, so that the movement of the cores of any one of these solenoids will open the circuit of the pilot-motor. By the closing of circuit-closer A the circuit of motor M is closed at contact $a'$ and $a^2$. The field-circuit is thereby connected between line L and earth E. The armature-circuit is still open, however, at the switch D. When cross-head $d$ rises a sufficient amount to engage the lowest contacts of switch D, the armature-circuit is closed with all the resistances R R in series therewith. Motor M consequently starts with the proper amount of resistance in series. As cross-head $d$ rises the contacts $d^2$ and $d'$ are raised, contact $d^2$ being pressed upward by a spring, as shown in Fig. 1, so as to engage contact $d^5$, contact $d'$ being similarly pressed up, so as to leave contact $d^3$ and to engage contact $d^4$. The circuit of circuit-closer A is not opened, however, by contact $d'$ leaving $d^3$, since these contacts, as well as the contacts of the governor, have been short-circuited by the rising of circuit-closer A, which brings its lowest bridging member into engagement with contacts $a^5$ and $a^6$. If the starting-current of the motor exceeds a predetermined amount, throttle C is actuated and lifts its core, opening the circuit of pilot-motor M at contacts $c'$ and $c^2$, thereby preventing any further movement of cross-head $d$ and further cutting out of resistance until motor M speeds up a sufficient amount to raise its back electromotive force, so as to reduce the current-flow in the armature-circuit. Throttle C then allows its core to fall, again closing the circuit of pilot-motor $m$ and allowing it to raise cross-head $d$ still farther to cut out more resistance from the armature-circuit of motor M. This action continues until cross-head $d$ reaches the top contacts of switch D. At this point the resistances R R are out of circuit, and motor-armature M is connected directly to line. At the same time cross-head $d$ opens the circuit of pilot-motor $m$ at contacts $d^6$ and $d^7$, the actual construction of these contacts being as shown in Figs. 1 and 2. Pilot-motor $m$ consequently stops. Contacts $d^6$ and $d^7$ also operate to open the circuit of relief-valve trip B. The core of relief-valve trip B is allowed to fall, thereby closing the relief-valve and throwing the load onto the air-compressor. The motor consequently begins to compress air and operates until the pressure reaches a predetermined point at which the expansion of the double diaphragms of governor F produces a movement of the governor-levers and snaps lever $h^5$ from contact $f^2$ to contact $f^3$. The circuit of pilot-motor $m$ is then closed as follows: from line L to switch $s'$, armature of motor $m$, upper half of the field, contact $d^5$, contact $d^2$, governor-contact $f^3$, member $h^5$, pin $f'$ to earth E. The pilot-motor $m$ is then connected to rotate screw $n$ in the proper direction to lower cross-head $d$ and gradually to insert resistances R R again in series with the motor-armature. This continues until cross-head $d$ leaves the lowest contacts of switch D, thereby opening the circuit of motor M and stopping the air-compressor, and until the cross-head $d$ engages contacts $d'$ and $d^2$, opening the circuit of pilot-motor $m$ at contacts $d^5$ and $d^2$. The circuits of the pilot-motor are then ready to be closed for again starting the motor when the pressure in the air-compressor falls sufficiently to again shift the governor-contact. It will be noted that whenever the switch member $h^5$ is automatically moved from one coöperating contact to the other by reason of a rise or fall in the pressure no live circuit is broken, but one is completed. In the position shown the switch member $h^5$ and the contact $f^2$ are short-circuited by the switch-arm $d'$ and contact $d^4$ as soon as the part D is raised. Again, the reversing-circuit for the pilot-motor is broken at $d^5$, so that when the pressure falls after the switch member $h^5$ has been moved into engagement with contact $f^3$ no current is flowing through contact $f^3$, and therefore no arc can form upon moving the contacts out of engagement with each other. The lost motion between the members $h^4$ $h^3$, however, permits the spring $j'$ to snap the switch-arm $h^5$ quickly into circuit-closing position after it has been partly actuated in either direction by the member $h^3$. The control of motor M is thus entirely automatic, and the pressure of the air-compressor is maintained within proper limits. Furthermore, by means of throttle C an excess flow of current to overload the motor or to blow a fuse is prevented and most efficient operation of the motor is secured. Throttle C could be omitted and the speed of pilot-motor $m$ adjusted so as not to overload the main motor; but in order to secure a proper factor of safety the time required for cutting out the starting resistance would need to be greater than when the throttle is used. By means of relief-valve trip B the pilot-motor is prevented from starting unless the relief-valve is open, thereby preventing too great a load from being thrown on the motor at starting and doing away with all danger of throwing the motor-belt. Relief-valve trip B may be omitted when circumstances do not require its use. By means of circuit-closer A if the current fails during the operation of the main motor the circuit of the main motor is opened and cannot be closed again until the resistances R R are cut into circuit and cross-head $d$ has been returned to its lowest or off position, thereby closing the circuit of circuit-closer A at contacts $d'$ and $d^3$. The opening of circuit-closer A closes the circuit of pilot-motor $m$ through contacts $d^5$, $d^2$, $a^7$, and $a^8$ to earth E, so that motor $m$ is properly connected to cut the resistance into circuit when the current comes on again. Circuit-closer A thus acts as a "no-voltage-release" magnet electrically interlocked with the resistance-controlling switch D. In this way not only is efficient operation of the main motor secured, but all possibility of overload is guarded against without the employment of fuses, which when blown would render the system inoperative until replaced.

I have thus shown and described a complete automatic control system which comprises a number of novel features, which, though I prefer to use them together, may with advantage be used separately. These features I desire to claim, whether used together or not. Much of the system as here described is applicable to other apparatus besides air-compressors—as, for instance, to liquid-storage reservoirs. Furthermore, many modifications may be made in the parts of the control mechanism and their connections which do not depart from the spirit of my invention, and I aim in the appended claims to cover all such modifications which are within the spirit and scope of my invention.

What I claim as new, and desire to secure by Letters Patent of the United States, is—

1. In combination with a main motor, resistances adapted to be connected in circuit therewith, an auxiliary motor, a screw driven thereby, a contact arranged to be reciprocated by said screw, stationary contacts connected to said resistances and adapted to be traversed by said reciprocating contact, a fluid-compressor driven by said main motor, and an automatic governor including a member operated by compressed fluid adapted to reverse said auxiliary motor.

2. In combination with a main motor, resistances adapted to be connected in circuit therewith, an auxiliary motor, a screw driven thereby, a contact arranged to be reciprocated by said screw, stationary contacts connected to said resistances and adapted to be engaged by said reciprocating contact, switch-contacts adapted to be operated by said reciprocating contact at each extremity of its travel and to open the circuit of said auxiliary motor, a fluid-compressor driven by said main motor, and an automatic governor including a member operated by compressed fluid adapted to reverse said auxiliary motor.

3. In combination with a main motor, a variable resistance connected in circuit therewith, an auxiliary motor controlling said resistance, an automatic governor adapted to reverse said motor, and an electromagnet adapted to open the circuit of said auxiliary motor upon a predetermined excess current-flow through said main motor and to close said circuit again upon a cessation of said excess flow.

4. In combination with a main motor, a starting resistance therefor, an auxiliary motor, a mechanism driven thereby and adapted to cut said resistance out of circuit, a magnet and contacts controlled thereby arranged to open the circuit of the main motor and of the magnet when said magnet is deënergized, and contacts controlled by said mechanism and arranged to close the circuit of said magnet independently of the first-named contacts only when said mechanism is in its off position.

5. In combination with a main motor, a starting resistance therefor, an auxiliary motor, a mechanism driven thereby and adapted to cut said resistance out of circuit, a "no-voltage-release" magnet arranged to open the circuit of the main motor and its own circuit upon failure of current, and means for closing the circuit of said magnet only when said mechanism is in off position.

6. In combination with a driving-motor for an air-compressor, a starting resistance therefor, an auxiliary motor, a mechanism driven thereby and adapted to cut said resistance out of circuit, electroresponsive means for relieving compression at starting, and means for deënergizing said electroresponsive means when said resistance is cut out of circuit.

7. In combination with a driving-motor for an air-compressor, a starting resistance therefor, an auxiliary motor, a mechanism driven thereby and adapted to cut said resistance out of circuit, a magnet arranged to relieve compression at starting, and switch-contacts adapted to be operated by said mechanism and arranged to deënergize said magnet when said resistance is cut out of circuit.

8. In combination with a driving-motor for an air-compressor, a starting resistance therefor, an auxiliary motor, a mechanism driven thereby and adapted to cut said resistance out of circuit, a pressure-operated governor controlling said motor, a magnet arranged to relieve compression at starting, connections between said magnet and said governor whereby said magnet is energized when said governor closes the circuit of said auxiliary motor for cutting out said resistance, and switch-contacts adapted to be operated by said mechanism and arranged to deënergize said magnet when said resistance is cut out of circuit.

9. In combination, a motor having an armature movable axially when said motor is energized, and a brake for said motor arranged to be released by said movement.

10. In combination, a motor having a vertical shaft and an armature adapted to be lifted by the field-flux when the motor is energized, and a brake for said motor arranged to be released when said armature is lifted.

11. In combination, a motor having a vertical shaft and an armature adapted to be lifted by the field-flux when the motor is energized, a friction-disk carried by said shaft, and a stationary friction-disk adapted to engage the first disk and to support the weight of said armature when the motor is deënergized.

12. In combination with a main motor, a starting resistance therefor, an auxiliary motor, a mechanism driven thereby and adapted to cut said resistance out of and into circuit, a "no-voltage-release" magnet arranged to open the circuit of the main motor and its own circuit upon failure of current and to connect said auxiliary motor for cutting in said resistance, and means for closing the circuit of said magnet only when said resistance is cut in.

In witness whereof I have hereunto set my hand this 17th day of May, 1904.

SAM H. LIBBY.

Witnesses:
ANNA M. GILLIN,
ROGER H. BUTTERWORTH.